(12) United States Patent
Ruscin et al.

(10) Patent No.: US 7,685,274 B2
(45) Date of Patent: Mar. 23, 2010

(54) METHOD AND APPARATUS FOR CLUSTERED FILTERING IN AN RFID INFRASTRUCTURE

(75) Inventors: John T. Ruscin, Cincinnati, OH (US); Sapan Shah, Ahmedabd (IN); Darshan Karandikar, Maharashtra (IN); Himanshu Rhariee, Mambai (IN); Viral Shah, Mumbai (IN); Yogeshwar Padhyegurjar, Mumbai (IN); Dhananjay Katre, Thane (IN); Akshay Hattangady, Maharashtra (IN); Julian Chultarsky, Cinicinnati, OH (US)

(73) Assignee: General Electric Company, Schenectady, NY (US)

( * ) Notice: Subject to any disclaimer, the term of this patent is extended or adjusted under 35 U.S.C. 154(b) by 515 days.

(21) Appl. No.: 11/615,114

(22) Filed: Dec. 22, 2006

(65) Prior Publication Data

US 2008/0155090 A1    Jun. 26, 2008

(51) Int. Cl.
    *G06F 15/16* (2006.01)
(52) U.S. Cl. .................. 709/224; 709/203; 340/10.1; 340/572.1
(58) Field of Classification Search ......... 709/200–203, 709/217–227; 340/572.1, 10.1
See application file for complete search history.

(56) References Cited

U.S. PATENT DOCUMENTS

| | | | |
|---|---|---|---|
| 5,805,785 A * | 9/1998 | Dias et al. ...................... 714/4 |
| 6,236,978 B1 | 5/2001 | Tuzhilin | |
| 6,449,734 B1 | 9/2002 | Shrivastava et al. | |
| 6,718,486 B1 | 4/2004 | Roselli et al. | |
| 6,938,091 B2 | 8/2005 | Das Sharma | |
| 6,970,070 B2 | 11/2005 | Juels et al. | |
| 7,161,489 B2 | 1/2007 | Sullivan et al. | |
| 7,317,394 B2 * | 1/2008 | Koh et al. ................. 340/572.1 |
| 7,394,377 B2 * | 7/2008 | Banerjee .................. 340/572.1 |
| 7,495,568 B2 * | 2/2009 | Banerjee .................. 340/573.1 |
| 2002/0040389 A1 * | 4/2002 | Gerba et al. ................. 709/219 |
| 2005/0278438 A1 * | 12/2005 | Sandaire ..................... 709/223 |
| 2006/0259525 A1 | 11/2006 | Bae et al. | |

* cited by examiner

*Primary Examiner*—Moustafa M Meky
(74) *Attorney, Agent, or Firm*—William Scott Andes, Esq.; Armstrong Teasdale LLP

(57) ABSTRACT

A method for removing duplicate data entries from a database that includes a plurality of application server nodes in an application server cluster includes tracking items using a plurality of ADA devices in a plurality of locations, receiving ADA observations over a network from the plurality of ADA devices, and balancing a load of data communications including the ADA observations so that the ADA observations are sent to different application server nodes of the application server cluster. The method further includes filtering duplicate observations at each application server node and separately filtering duplicate observations between the plurality of application server nodes.

20 Claims, 2 Drawing Sheets

METHOD AND APPARATUS FOR CLUSTERED FILTERING IN AN RFID INFRASTRUCTURE

BACKGROUND OF THE INVENTION

This invention relates generally to Radio Frequency Identification (RFID) enabled infrastructures, but is intended for any infrastructure dealing with Automated Data Acquisition (ADA), and more particularly to methods and apparatus for filtering duplicate data observations in such an infrastructure.

An enterprise can be defined as a body that comprises a plurality of business units. These business units, can, in turn, have a plurality of sites, and each site may have a plurality of locations. At least one known ADA enabled infrastructure for an enterprise offers architecture in which edge servers capture data deployed at various locations in the enterprise and pass filtered data to one or more enterprise servers responsible for interaction with enterprise applications. The hierarchy of edge enterprise servers can be expanded to ensure that a load is balanced and a single network path is not overloaded with information.

ADA devices are now being developed with new functionality that will handle filtering and data cleansing, and which pass only relevant, intelligently filtered information to upstream systems. Use of these devices will result in lower network traffic with little or no filtering required at the enterprise level. However, enterprise software will still be needed, because apart from filtering, additional tasks such as data collection, formatting, and event generation based upon various business rules must be performed and/or applied to data sent to the back end enterprise applications. In addition, the known current ADA (including RFID) architecture does not support a clustered environment. A clustered environment is an architecture comprising several servers, with the same specific software, that act in concert to share the load of data processing needs.

It has not previously been known that clustered filtering prior to RFID might be needed in some applications. Moreover, because the RFID market is oriented towards an edge-enterprise infrastructure, the need for clustered filtering on centralized software in a clustered environment has not been foreseen.

In at least one known conventional configuration, RFID middleware receives data (hereinafter referred to as an "RFID observation") from various devices, which may include, but are not limited to, RFID readers, active sensors, and/or PLC devices. (Hereinafter, each of these types of devices will be referred to simply as "RFID readers," although no loss in generality is intended.) These RFID observations may be received in either or both of two different modes.

In an interactive (request/response) mode, the RFID readers are polled by middleware running on non-RFID application server nodes (i.e., nodes that do not specifically handle RFID observations directly received from RFID readers) at a selected frequency. The RFID readers, in turn, return RFID observation details. Over a cluster of non-RFID application server nodes having the same modules deployed on each node, each non-RFID application server node may selectively poll RFID readers and fetch the RFID observation information for further filtering.

In an asynchronous mode, the RFID reader sends RFID observations without the middleware sending any command to the RFID reader. In this mode, an RFID reader sends observation information to one or more load-balancing devices. The load-balancing device(s) then redirect the request to an RFID application server node in an RFID application server cluster in accordance with configured rules.

In either case, the plurality of application server nodes in a cluster may receive unfiltered RFID observations from the RFID readers. Conventionally, each of the RFID application server nodes filters the RFID observations independently and sends the filtered RFID observations to the backend application running on the corresponding non-RFID application server node. In many cases, this behavior leads to the backend application receiving many duplicate RFID observations as each RFID application server node has filtered the data reads independent of every other RFID application server node. Similarly, if an RFID observation is to be purged from memory, one must ensure that it is purged from the memory of all instances that received the observation information.

BRIEF DESCRIPTION OF THE INVENTION

In one aspect, some configurations of the present invention therefore provide a method for removing duplicate data entries to a database that includes a plurality of application server nodes in an application server cluster. The method includes tracking items using a plurality of ADA devices (henceforth, an ADA device is any device that performs data acquisition such as a bar code scanner, optical sensor or RFID reader) in a plurality of locations, receiving multiple observations over a network from the plurality of ADA devices, and balancing a load of data communications including the multiple observations so that the observations are sent to different application server nodes of the application server cluster. The method further includes filtering duplicate observations at each application server node and separately filtering duplicate observations between the plurality of application server nodes.

In another aspect, some configurations of the present invention provide a clustered filtering apparatus. The clustered filtering apparatus includes a plurality of ADA devices in a plurality of locations, an application server cluster comprising a plurality of application server nodes, each comprising a duplicate observation filter configured to remove duplicate observations from the application server, a network traffic manager communicating with the plurality of ADA devices and/or software controlling those devices and configured to distribute traffic from the plurality of ADA devices to the plurality of application server nodes, and a shared event controller configured to filter duplicate observations between different application server nodes in the application server cluster.

It will be appreciated that some configurations of the present invention provide a consolidation of data from all nodes in a cluster into one shared target that can comprise, for example, a data base table or a shared object of the application servers on a cluster that is common to all nodes. This target can host information in such a way that it will not allow duplicate observation information receipts from any of the individual nodes. Uniqueness of observations is maintained across different nodes.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry.

DETAILED DESCRIPTION OF THE INVENTION

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the term "asynchronous mode" refers to the fact that ADA devices are always running, so that read observations are often repeated while, for example, a box with an RFID tag is sitting in a warehouse within range of an RFID reader.

Various configurations of the present invention take advantage of load balancing and fail-over mechanisms in a clustered environment. Any of a variety of load balancing and/or fail-over mechanisms can be used, as well as any of a variety of application servers.

A technical effect of various configurations of the present invention is the filtering of multiple ADA observations processed by each application server node in a cluster and the passing of consolidated observations to a backend application. Multiple data observations are consolidated from all nodes of a cluster into one shared target comprising a database table or a shared object of the application servers on a cluster common to all server nodes. This shared target hosts the observations in such a way that duplicate observations from any of the individual server nodes are not allowed. Each server node can attempt to update the shared object. If observations are already available with the shared object through another server node, the observation information is updated rather than added. In this manner, the uniqueness of observations is maintained across different server nodes of a cluster. The updated observations are made available to other modules via the shared object.

Figure 1:
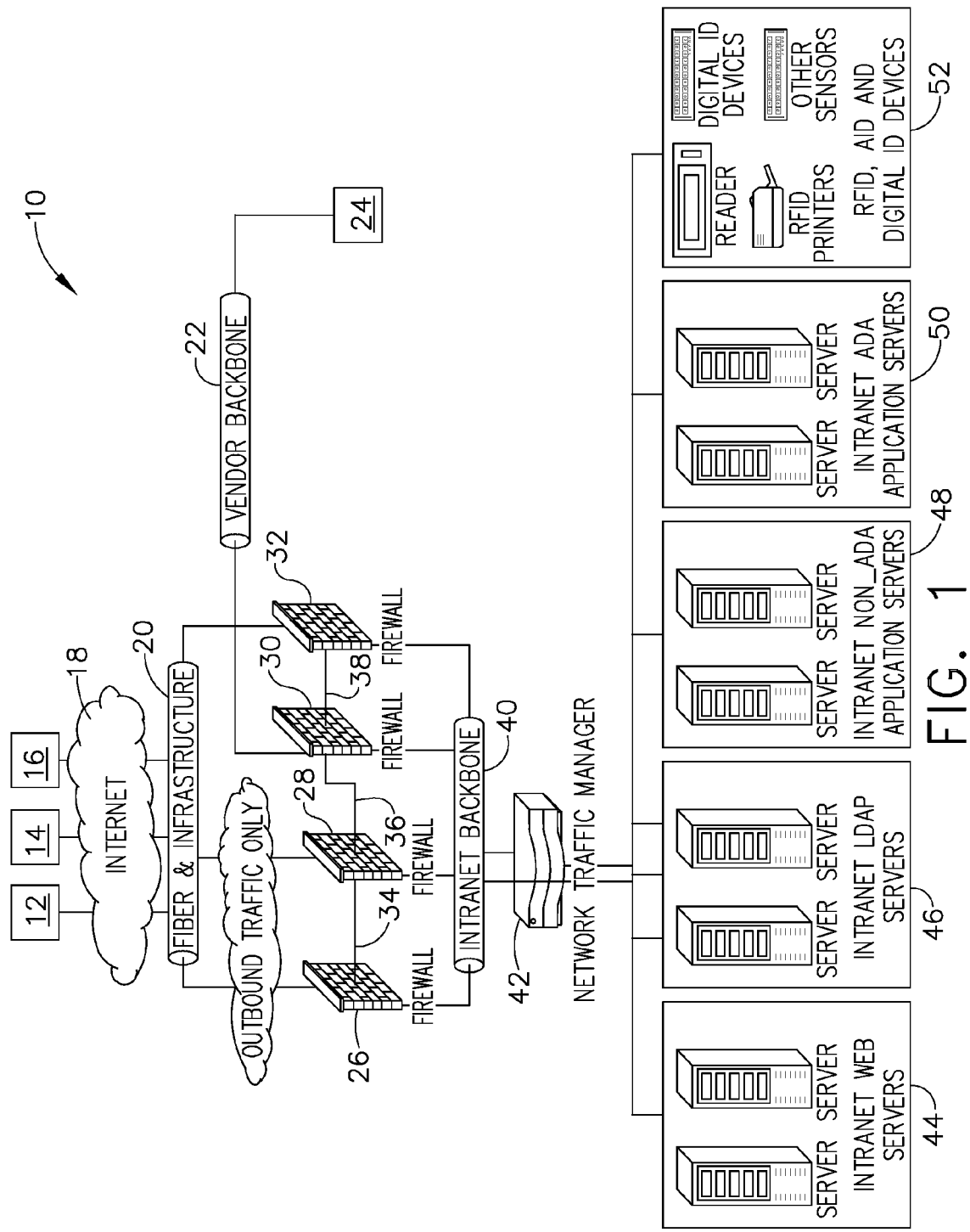
FIG. 1 is a block schematic drawing of an IT infrastructure including a configuration of the present invention.

Referring to FIG. 1, some configurations of the present invention can best be utilized by an organization in association with an IT infrastructure 10. IT infrastructure 10 can connect to, for example, external computers such as 12, 14, and 16 via a network backbone, such as the Internet 18. External computers 12, 14, and 16 could be external servers such as an information source (for example, the GOOGLE® search engine). External computer 12 may deliver information to other computers within IT infrastructure 10. An infrastructure backbone 20 provides connectivity with Internet 18. One or more vendor backbones 22 permit a revenue sharing partner or partners, joint venture(s), or other trusted partner(s) to access information internal to IT infrastructure 10. Vendor backbone 22 should have enhanced security relative to infrastructure backbone 20, although extra security need not be provided in all configurations of the present invention. One or more vendor servers 24 may communicate via vendor backbone 22 with computers within IT infrastructure 10.

One or more firewalls, such as firewalls 26, 28, 30, and 32 may be provided. In some, but not necessarily all configurations of the present invention, a portion of the firewalls 26, 28, 30, and 32 may be restricted to processing outbound only traffic and/or a portion of the firewalls may be restricted to processing inbound only traffic. For example, in IT infrastructure configuration 10, firewalls 26 and 28 are restricted to processing outbound only traffic, while firewalls 30 and 32 process inbound and outbound traffic. In some configurations of IT infrastructure 10, a plurality of firewalls communicate with one another to monitor incoming and outgoing traffic via communication lines such as 34, 36, and 38 for ease of administration. For example, statistics concerning the monitored traffic are sent through an intranet backbone 40 (e.g., a gigabit backbone) to network traffic manager 42, which serves to distribute the traffic load amongst the firewalls 26, 28, 30, and 32.

IT infrastructure configuration 10 may also optionally have intranet web servers 44 and Internet lightweight directory access protocol (LDAP) servers 46.

Intranet non-ADA application servers 48 are used in configurations of the present invention to host backend applications that can query RFID, automatic ID (AID), and digital I/O devices 52, hereinafter referred to (for simplicity only, and without loss of generality) as ADA devices 52. Also included are intranet ADA application servers 50. Referring to FIG. 1, configurations of the present invention allow ADA devices 52 to be located on the Internet 18 or on vendor backbone 22. However, for security reasons, many organizations are likely to limit the location of non-ADA application servers 48, ADA application servers 50 and ADA devices 52 to locations inside the organization's own firewall.

Figure 2:
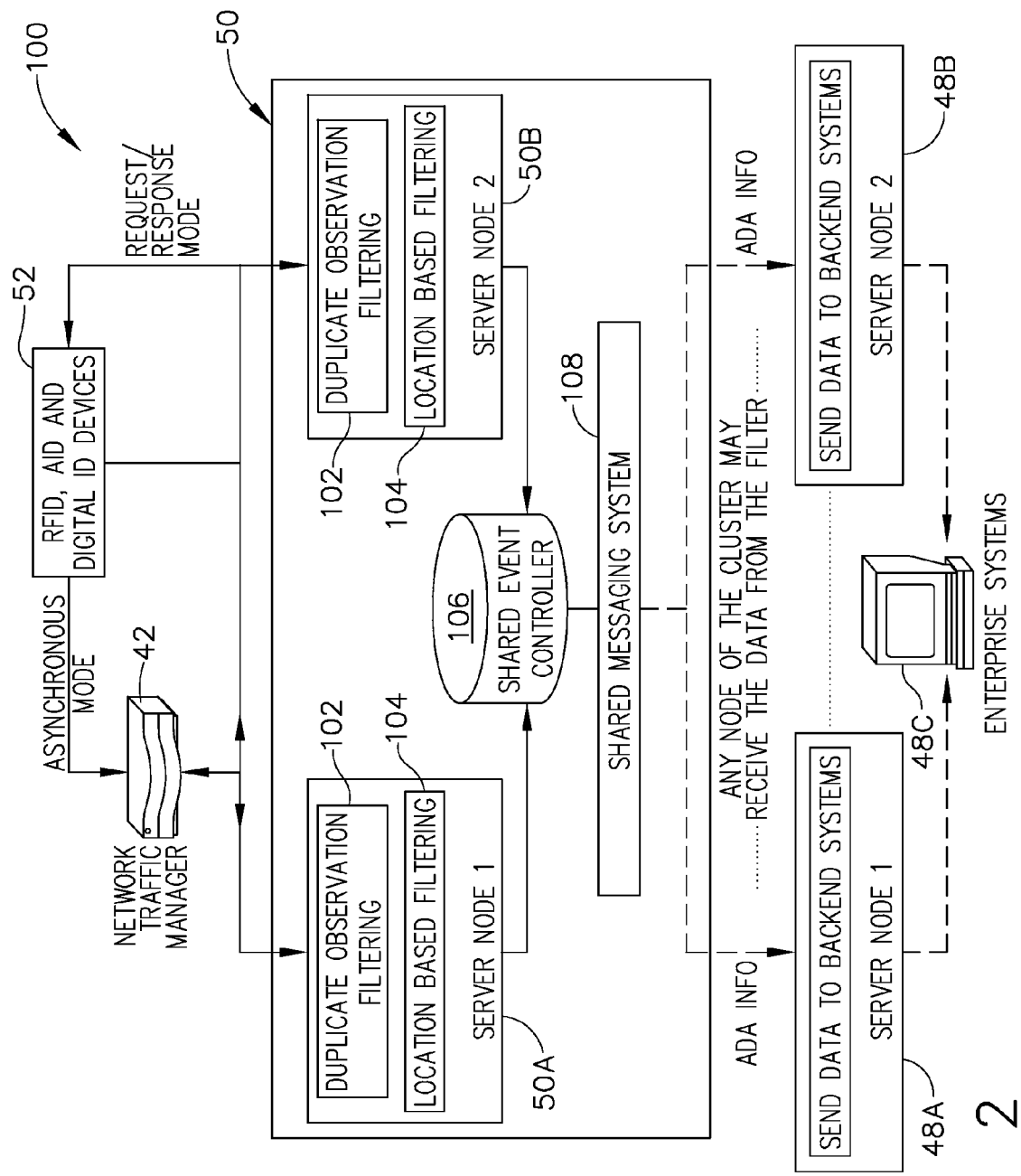
FIG. 2 is a block schematic drawing showing a configuration of the present invention useful in the IT infrastructure of FIG. 1.

In some configurations of the present invention, and referring to FIG. 2, a clustered filtering system 100 can comprise ADA devices 52, network traffic manager 42, application server cluster 50, and non-ADA application servers 48. ADA devices 52 communication in either asynchronous mode with network traffic manager 42 or in request/response mode with application server cluster 50, where clustered filtering software is hosted on one or more server nodes of cluster 50 (for example, on server nodes 50A and 50B). A duplicate observation filtering software module 102 runs in each of the server nodes 50A and 50B. Modules 102 filter reads from each server node (50A and 50B in the present example) into unique observations for each server node. Server nodes 50A and 50B take observations from ADA devices 52, which can send multiple observations per second to each server node. The load resulting from many devices operating rapidly and at the same time (plus any other data being processed by IT infrastructure 10) is balanced by network traffic manager 42, which could potentially split the multiple observations per second amongst a plurality of server nodes 50A and 50B in this example.

For each server node 50A and 50B, duplicate observation filtering modules 102 take duplicate RFID observations for the separate server nodes 50A and 50B and filter the duplicate observations down into one observation for each server node 50A and 50B.

Even though duplicate observations in server node 50A are filtered out, and duplicate observations in server 50B also are filtered out, there is still a probability of duplicate observations between server nodes 50A and 50B. Thus, observations in each server node 50A and 50B are combined and filtered over application server cluster 50 by shared event controller module 106 into a single unique observation over the entire application server cluster 50. Other types of filtering can be performed in each server node 50A and 50B. For example, example cluster filtering system 100 configuration adds a location based filtering module 104 in each server node 50A and 50B.

In some configurations, additional filtering is provided in server nodes 50. For example, server node 50A and 50B each include location (i.e., geography) based filtering 104. Thus, if an organization has server nodes at a plurality of different shops and/or warehouses, and inside of each shop or warehouse, a location for each item scanned at different dock doors and/or at each table where data is collected by ADA devices, filtering 104 can be provided based upon those locations. Location based filtering 104 filtering other than duplicate observation filtering 102 is not required to practice the present invention, however.

For example, suppose that an RFID tag is used to identify and reference a box of spare parts. This box is observed once at a location "A" and once at a different location "B," thereby providing two duplicate RFID observations for that RFID tag. RFID readers 52 are provided at each location "A" and "B." The observations of the RFID tag at each location traverse intranet 40 before arriving at network traffic manager 42, which sends it to RFID application servers 50. Multiple RFID observations may possibly be sent to different application server nodes 50A and 50B, even if the box with the RFID tag does not change locations but instead merely remains close to an RFID reader. Thus, server nodes 50A and 50B may each receive duplicate RFID observations for the same box at the same location. Assume that the RFID for this box is "1023 2044," which is observed, possibly multiple times, by RFID readers at locations "A" and "B." Referring to FIG. 2, duplicates sent to each server node 50A and 50B (and any other servers) are filtered out at duplicate observation filters 102 in each such server. Thus, only one reference to RFID "1023 2044" exists in each server node, e.g., 50A and 50B.

Some configurations also provide other filtering, such as location based filtering 104 in one or more server nodes 50A, 50B, etc. Such other filtering may occur before or after duplicate observation filtering 102, or in parallel with it, depending upon the service for which the server is deployed. However, filters 102 and 104 are deployed prior to data being sent to shared event controller 106, which inputs filtered data from one or more server nodes 50A, 50B, etc., in application server cluster 50 and filters this data into a single read observation.

If there is a lot of traffic resulting from ADA observations over intranet 40 (a common occurrence in ADA systems), and network traffic manager 42 is sending those observations to the different intranet application server nodes 50A, 50B, etc., a unique observation will be sent from server cluster 50. If these observations are required by back-end servers 48A, 48B in, for example, intranet non-ADA server cluster 48, shared event controller 106 analyzes the observations coming out, and does a last filtering check to filter down to one unique observation.

A protocol generator or shared messaging system 108 in application server cluster 50 is used to send observations to, for example, non-ADA application server nodes 48A and 48B. Only a node 48A or 48B that receives the observations from the cluster based filter will send it to a back-end system 48C, which is, for example, a mainframe computer. Back-end system 48C can thus provide a location for a part, without providing duplicate records for that part.

Metadata can be included in each observation in some configurations of the present invention, such as information about the time the observation was made by the ADA device and where the observation was made. Thus, if there is a reader in an inbound dock door, the metadata may include the reader IP address, from which its location at, for example "inbound doc door number 1 at Torrid Heights, N. Mex." can be ascertained. The reader IP address is transmitted along with a tag ID, a time stamp (when it was read), and, if necessary, additional location information. Duplicate observation filtering in some configurations is time-sensitive, so that the present location of a part can be accurately determined from the latest read.

Although only two ADA application server nodes 50A and 50B are used in the above example configuration, it will be evident that configurations of the present invention are scalable and can be used, with even greater benefits, with larger numbers of ADA server nodes (for example, a half dozen or more), and also with additional non-ADA server nodes. The shared event controller ensures that one unique observation will be reported every time.

While the invention has been described in terms of various specific embodiments, those skilled in the art will recognize that the invention can be practiced with modification within the spirit and scope of the claims.

What is claimed is:

1. A method for removing duplicate data entries from a database having a plurality of application server nodes in an application server cluster, said method comprising:
   tracking items using a plurality of ADA devices in a plurality of locations;
   receiving ADA observations over a network from the plurality of ADA devices;
   balancing a load of data communications including the ADA observations so that the observations are sent to different application server nodes of the application server cluster;
   filtering duplicate ADA observations at each application server node; and
   separately filtering duplicate ADA observations between the plurality of application server nodes.

2. A method in accordance with claim 1 wherein said filtering duplicate ADA observations at each application server node is performed as the observations are received by the application server nodes.

3. A method in accordance with claim 2 wherein said separately filtering duplicate ADA observations between the plurality of application server nodes is performed in response to a request for a data observation description by a non-ADA application server node.

4. A method in accordance with claim 1 wherein said receiving ADA observations over a network from the plurality of ADA devices further comprises receiving observations over an intranet.

5. A method in accordance with claim 1 wherein said receiving ADA observations over a network from the plurality of ADA devices further comprises receiving ADA observations via a vendor backbone.

6. A method in accordance with claim 1 wherein said receiving ADA observations over a network from the plurality of ADA devices further comprises receiving ADA observations via an Internet.

7. A method in accordance with claim 1 further comprising applying an additional filter for ADA observations at each application server node.

8. A method in accordance with claim 7 wherein the additional filter for ADA observations includes a location filter.

9. A method in accordance with claim 1 wherein said receiving ADA observations over a network from the plurality of ADA devices comprises polling the ADA devices by software at a frequency, wherein, in turn, the ADA devices return ADA observations.

10. A method in accordance with claim 1 wherein said receiving ADA observations over a network from the plurality of ADA devices comprises sending, via the ADA devices ADA observation information without being polled.

11. A clustered filtering apparatus comprising:
a plurality of ADA devices in a plurality of locations;
an application server cluster comprising a plurality of application server nodes, each anplication server node comprising a duplicate observation filter configured to remove duplicate ADA observations from said application server node;
a network traffic manager communicating with said plurality of ADA devices and configured to distribute traffic from said plurality of ADA devices to said plurality of application server nodes; and
a shared event controller configured to filter duplicate ADA observations between a first one of said application server nodes and a second one of said application server nodes in said application server cluster.

12. An apparatus in accordance with claim 11 further comprising a shared messaging system configured to provide a protocol for sending observations to an intranet non-ADA application server node requesting the observations.

13. An apparatus in accordance with claim 11 configured to filter duplicate observations at each application server node as the observations are received.

14. An apparatus in accordance with claim 13 configured to filter duplicate observations between said plurality of application server nodes in response to a request for an observation by a non-ADA application server.

15. An apparatus in accordance with claim 11 configured to receive ADA observations over an intranet.

16. An apparatus in accordance with claim 11 further comprising a vendor backbone, and further configured to receive ADA observations via said vendor backbone.

17. An apparatus in accordance with claim 11 configured to receive ADA observations via an Internet.

18. An apparatus in accordance with claim 11 further comprising an additional filter for observations at each said application server node.

19. An apparatus in accordance with claim 11 configured to poll said ADA devices at a frequency, wherein, in turn, said ADA devices return observations.

20. An apparatus in accordance with claim 11 configured to asynchronously receive ADA observations over a network from said ADA devices.

* * * * *